(12) United States Patent
Omori

(10) Patent No.: US 11,314,606 B2
(45) Date of Patent: Apr. 26, 2022

(54) SUBSTITUTION DEVICE, INFORMATION PROCESSING SYSTEM, AND SUBSTITUTION METHOD

(71) Applicant: MITSUBISHI ELECTRIC CORPORATION, Tokyo (JP)

(72) Inventor: Yasuhiro Omori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 287 days.

(21) Appl. No.: 16/344,323

(22) PCT Filed: Jan. 10, 2017

(86) PCT No.: PCT/JP2017/000510
§ 371 (c)(1),
(2) Date: Apr. 23, 2019

(87) PCT Pub. No.: WO2018/131079
PCT Pub. Date: Jul. 19, 2018

(65) Prior Publication Data
US 2019/0384683 A1 Dec. 19, 2019

(51) Int. Cl.
*G06F 11/20* (2006.01)
*G06F 11/22* (2006.01)
(Continued)

(52) U.S. Cl.
CPC ...... *G06F 11/2028* (2013.01); *G05B 23/0289* (2013.01); *G06F 11/0796* (2013.01);
(Continued)

(58) Field of Classification Search
CPC .................................................. G06F 2201/805
See application file for complete search history.

(56) References Cited

U.S. PATENT DOCUMENTS 5,655,069 A 8/1997 Ogawara et al.
6,718,483 B1 4/2004 Kimura
(Continued)

FOREIGN PATENT DOCUMENTS

JP 8-44581 A 2/1996
JP 9-62528 A 3/1997
(Continued)

OTHER PUBLICATIONS

Indian Office, dated May 25, 2021, for Indian Application No. 201947023934, with an English translation.
(Continued)

*Primary Examiner* — Santosh R Poudel
(74) *Attorney, Agent, or Firm* — Birch, Stewart, Kolasch & Birch, LLP

(57) ABSTRACT

A reconfiguration circuit (352) generates a control value for controlling an output value of a control target device based on an input value, and when a fault occurs in an information processing circuit (200) that outputs the control value generated to the control target device, performs preparation for substituting for the information processing circuit (200). Upon completion of the preparation, a reconfiguration target circuit (510) generates an output plan of a control value such that a difference between an actual output value of the control target device and an output value in a scheduled temporal transition gradually decreases, based on the scheduled temporal transition that is a temporal transition of an output value of the control target device, which is scheduled before occurrence of the fault in the information processing circuit (200), a difference between an actual output value of the control target device upon completion of the preparation and an output value in the scheduled temporal transition, and an input value and a control value before occurrence of the fault in the information processing circuit (200), and outputs (Continued)

a control value to the control target device instead of the information processing circuit (200) according to the output plan generated.

6 Claims, 6 Drawing Sheets

(51) Int. Cl.
  *G06F 11/07* (2006.01)
  *G05B 23/02* (2006.01)
(52) U.S. Cl.
  CPC ...... *G06F 11/2051* (2013.01); *G06F 11/2236* (2013.01); *G06F 2201/805* (2013.01)

(56) References Cited

U.S. PATENT DOCUMENTS

| | | | |
|---|---|---|---|
| 2006/0070017 | A1 | 3/2006 | Hayashi |
| 2007/0168058 | A1* | 7/2007 | Kephart ............... G06F 11/2028 700/82 |
| 2012/0112759 | A1* | 5/2012 | Kn ....................... F15B 19/005 324/523 |
| 2014/0084683 | A1* | 3/2014 | Goodrum ................. H02J 5/00 307/18 |
| 2016/0128144 | A1* | 5/2016 | Tikkanen ............... H05B 45/60 315/301 |
| 2018/0039248 | A1* | 2/2018 | Annen ................ G06F 11/3409 |

FOREIGN PATENT DOCUMENTS

| | | |
|---|---|---|
| JP | 2000-81991 A | 3/2000 |
| JP | 2001-34496 A | 2/2001 |
| JP | 3165320 B2 | 5/2001 |
| JP | 2003-115847 A | 4/2003 |
| JP | 2006-85555 A | 3/2006 |
| JP | 2009-140353 A | 6/2009 |
| JP | 2010-128514 A | 6/2010 |
| JP | 2011-216020 A | 10/2011 |
| JP | 2012-168605 A | 9/2012 |
| WO | WO-2016170614 A1 * | 10/2016 .......... G06F 11/3013 |

OTHER PUBLICATIONS

International Search Report for PCT/JP2017/000510 (PCT/ISA/210) dated Mar. 21, 2017.

* cited by examiner

SUBSTITUTION DEVICE, INFORMATION PROCESSING SYSTEM, AND SUBSTITUTION METHOD

TECHNICAL FIELD

The present invention relates to a substitution device that substitutes for an information processing circuit, when a fault occurs in the information processing circuit.

BACKGROUND ART

In a system in which it is desired to continue processing even if a trouble such as a fault occurs, a fault-tolerant design is made. In the fault-tolerant design, an information processing circuit is multiplexed. Further, in the fault-tolerant design, when a fault occurs in one information processing circuit, the information processing circuit having the fault is separated, and another information processing circuit that is normally operating continues processing.

However, in a system requiring high reliability under strict cost conditions, it may be difficult to multiplex the information processing circuit. In such a highly reliable system requiring low cost, the fault-tolerant design cannot be made. Therefore, in the highly reliable system requiring low cost, the only available method is to have a fault detection function inside the system or outside the system, and when a fault occurs in the information processing circuit, the information processing circuit is stopped so that the information processing circuit does not perform an abnormal operation.

Therefore, in the system requiring high reliability and low cost, a method of realizing fault tolerant without multiplexing the information processing circuit to enable continuous operations has been desired.

Patent Literature 1 discloses a system including a plurality of information processing circuits and a fault detection device that detects a fault. In the system disclosed in Patent Literature 1, when a fault occurs in any of the information processing circuits, the fault detection device detects the fault. In the system disclosed in Patent Literature 1, the function of the information processing circuit having the fault is substituted by the fault detection device, and the fault detection device continues the operation of the information processing circuit having the fault.

Further, the system in Patent Literature 1 includes reconfiguration means and a reconfiguration-data storing circuit. The reconfiguration-data storing circuit holds therein circuit information for performing a substitution operation of the respective information processing circuits. If it is detected that a fault occurs in any of the information processing circuits, the reconfiguration means reads circuit information for a substitution operation of the information processing circuit having the fault from the reconfiguration-data storing circuit. The reconfiguration means then reconfigures the fault detection device as a substitution device of the information processing circuit having the fault. Accordingly, the operation of the information processing circuit having a fault can be maintained and the system can continue the operation even after the occurrence of the fault.

In this manner, by using the technique disclosed in Patent Literature 1, the operation of the information processing circuit in which a fault has occurred can be continued even at the time of the occurrence of the fault without multiplexing the information processing circuit.

Patent Literature 2 also discloses a configuration having an information processing circuit and a fault detection device. According to the technique disclosed in Patent Literature 2, when a part of functions of the information processing circuit has a fault, the fault detection device specifies a fault part and reconfigures the specified fault part to a normal state. Further, according to the technique disclosed in Patent Literature 2, the fault detection device holds in an external memory intermediate data used for calculation by the information processing circuit before the occurrence of the fault. After the fault detection device reconfigures the fault part to a normal state, the fault detection device reads out the intermediate data from the external memory, thereby enabling to resume the processing before the occurrence of the fault.

CITATION LIST

Patent Literature

Patent Literature 1: JP 2000-81991
Patent Literature 2: JP 2001-34496

SUMMARY OF INVENTION

Technical Problem

In Patent Literature 1, a certain period of time is required until the fault detection device is reconfigured as the substitution device. Until the fault detection device is reconfigured as the substitution device, the operation having been performed by the information processing circuit having a fault is not performed. That is, during a period until the fault detection device is reconfigured as the substitution device, control to a control target device which has been controlled by the information processing circuit is not executed. Therefore, a problem may occur in the operation of the control target device depending on the time required for reconfiguration.

When the fault detection device is realized by using an FPGA (Field-programmable Gate Array), a time from several tens of milliseconds to several seconds is required until the fault detection device is reconfigured as the substitution device. The required time changes depending on the scale of the substitution device and a reconfiguration method. It is assumed that several seconds are required until the fault detection device is reconfigured as the substitution device and the substitution device can start a normal operation. In this case, it can be considered that input information to the system largely changes from the input information before the occurrence of a fault during the several seconds. Further, it can be considered that the state of the control target device changes during the several seconds. Therefore, if the substitution device resumes the same arithmetic operation as that before the occurrence of the fault, the operation of the control target device may change suddenly.

For example, it is assumed that the technique in Patent Literature 1 is applied to a self-driving system that controls an actuator of a vehicle.

It is assumed that several seconds are required after a fault has occurred in an information processing circuit until a substitution device becomes operable. During the several seconds, the self-driving system cannot control the actuator and an output of the actuator decreases. When the substitution device resumes control of the actuator in a state with the output of the actuator decreasing, since the substitution device does not recognize the output decrease of the actuator, the substitution device executes control to cause an excessive output, compared to the current output of the actuator. As a result, the movement of the vehicle changes suddenly. Due to the sudden change of the movement of the vehicle, vehicles and pedestrians nearby may be endangered.

Also in Patent Literature 2, as in the technique disclosed in Patent Literature 1, if the input information and the state of the control target device have changed in a period until reconfiguration, safe control cannot be executed so that the operation of the control target device does not change suddenly after the reconfiguration.

As described above, according to the conventional techniques, the substitution device controls the control target device without recognizing a change in the output state of the control target device, which has occurred in a period until the reconfiguration of the substitution device is made. Therefore, according to the conventional techniques, there is a problem that the substitution device cannot control the control target device appropriately, if the output state of the control target device has changed in the period until the reconfiguration of the substitution device is made.

A main object of the present invention is to solve such a problem. That is, the present invention mainly aims to provide a configuration in which even if an output state of a control target device has changed, the control target device can be controlled appropriately.

Solution to Problem

A substitution device includes:

a substitution preparation unit to generate a control value for controlling an output value of a control target device based on an input value, and when a fault occurs in an information processing circuit that outputs the control value generated to the control target device, performing preparation for substituting for the information processing circuit; and a substitution unit to generate, upon completion of the preparation, an output plan of a control value such that a difference between an actual output value of the control target device and an output value in a scheduled temporal transition gradually decreases, based on the scheduled temporal transition that is a temporal transition of an output value of the control target device, which is scheduled before occurrence of the fault in the information processing circuit, a difference between an actual output value of the control target device upon completion of the preparation and an output value in the scheduled temporal transition, and an input value and a control value before occurrence of the fault in the information processing circuit, and output a control value to the control target device instead of the information processing circuit according to the output plan generated.

Advantageous Effects of Invention

According to the present invention, an output plan of a control value is generated such that a difference between an actual output value of a control target device and an output value in a scheduled temporal transition gradually decreases, and a control value is output to the control target device according to the generated output plan. Accordingly, even if an output state of the control target device has changed, the control target device can be controlled appropriately.

DESCRIPTION OF EMBODIMENTS

An embodiment of the present invention will be explained below with reference to the drawings. In the following descriptions of the embodiment and the drawings, elements denoted by the same reference signs indicate the same or corresponding parts.

First Embodiment

Descriptions of Configuration

In the present embodiment, an information processing system 10 in which an information processing circuit is not multiplexed is described.

Figure 1:
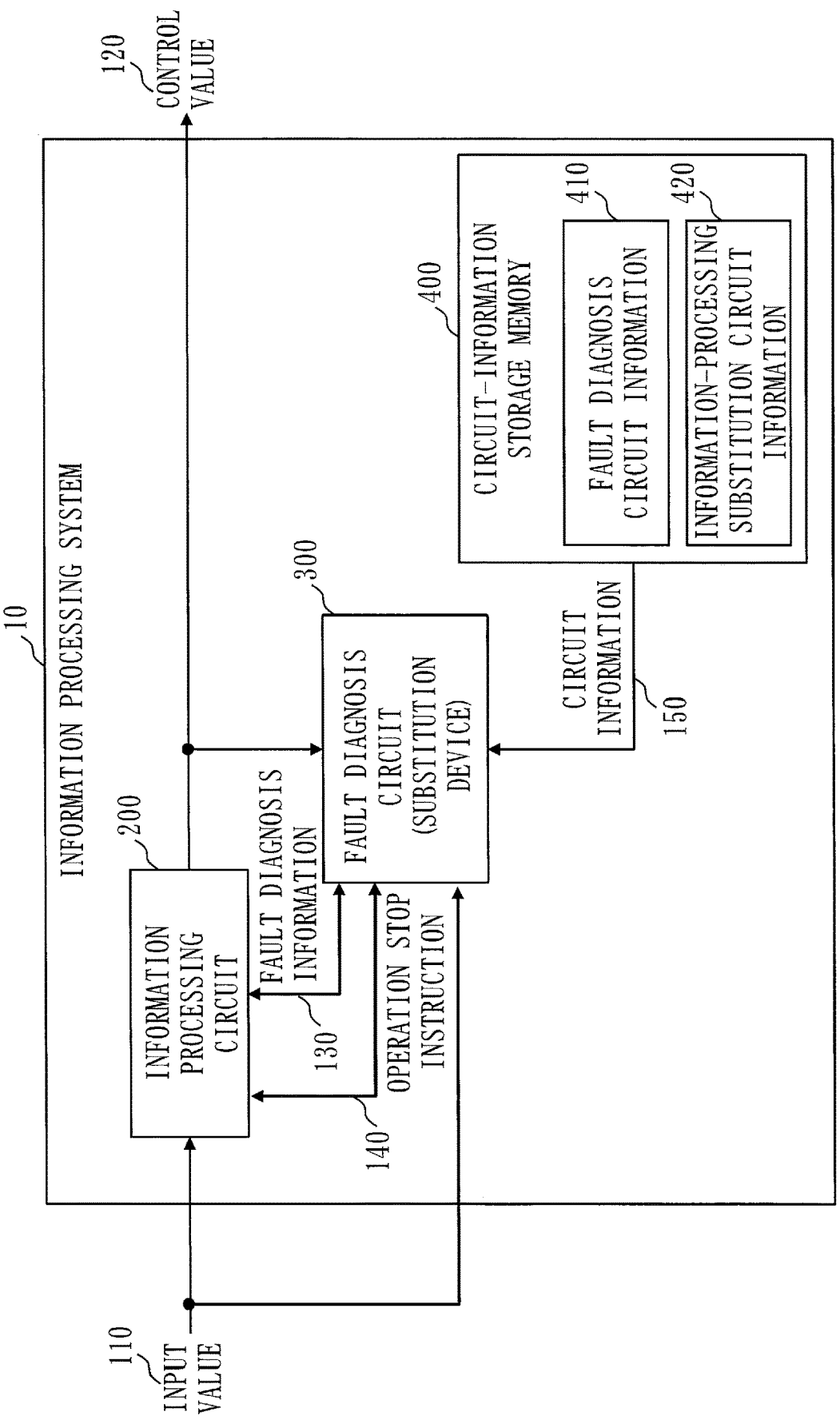
FIG. 1 is a diagram illustrating a configuration example of an information processing system including a fault diagnosis circuit according to a first embodiment.

FIG. 1 illustrates a configuration example of the information processing system 10 according to the present embodiment.

The information processing system 10 is configured by an information processing circuit 200, a fault diagnosis circuit 300, and a circuit-information storage memory 400.

The information processing circuit 200 controls a control target device which is not illustrated. The control target device is, for example, an actuator.

The information processing circuit 200 generates a control value 120 for controlling an output value of the control target device based on an input value 110, and outputs the generated control value 120 to the control target device.

Further, the information processing circuit 200 detects a fault in the fault diagnosis circuit 300.

The fault diagnosis circuit 300 acquires the input value 110 and the control value 120, and memorizes therein the acquired input value 110 and control value 120. Further, the fault diagnosis circuit 300 monitors fault diagnosis information 130 from the information processing circuit 200 to detect a fault in the information processing circuit 200. When detecting a fault in the information processing circuit 200, the fault diagnosis circuit 300 outputs an operation stop instruction 140 to the information processing circuit 200 to cause the information processing circuit 200 to stop its operation. Further, the fault diagnosis circuit 300 substitutes for the information processing circuit 200 as an information-processing substitution circuit 500 and controls the control target device.

In the following descriptions, a circuit that monitors the information processing circuit 200 to detect a fault in the information processing circuit 200 is referred to as fault diagnosis circuit 300. A circuit that substitutes for the information processing circuit 200 to control the control target device is referred to as an information-processing substitution circuit 500. The information-processing substitution circuit 500 is described later with reference to FIG. 2.

The fault diagnosis circuit 300 and the information-processing substitution circuit 500 correspond to a substitution device.

The circuit-information storage memory 400 memorizes therein fault diagnosis circuit information 410 and information-processing substitution circuit information 420.

The fault diagnosis circuit information 410 is information indicating an internal configuration of the fault diagnosis circuit 300.

The information-processing substitution circuit information 420 is information indicating an internal configuration of the information-processing substitution circuit 500.

Before describing the details of the information processing circuit 200, the fault diagnosis circuit 300, and the circuit-information storage memory 400, outlines of the information processing circuit 200, the fault diagnosis circuit 300, and the circuit-information storage memory 400 are described.

The information processing circuit 200 performs an arithmetic operation based on the input value 110 to generate the control value 120. The information processing circuit 200 outputs the control value 120 to the control target device outside of the information processing system 10.

The fault diagnosis circuit 300 acquires the input value 110 and the control value 120, and memorizes therein the acquired input value 110 and control value 120. The fault diagnosis circuit 300 also acquires fault diagnosis information 130 being information indicating an internal state of the information processing circuit 200, to diagnose the internal state of the information processing circuit 200. When detecting a fault in the information processing circuit 200 as a result of diagnosis, the fault diagnosis circuit 300 provides the operation stop instruction 140 to the information processing circuit 200 to cause the information processing circuit 200 to stop its operation.

Further, the fault diagnosis circuit 300 operates from startup of the information processing system 10 until detection of the fault occurrence in the information processing circuit 200.

The fault diagnosis circuit 300 is configured based on the fault diagnosis circuit information 410 in the circuit-information storage memory 400.

The fault diagnosis circuit 300 detects a fault in the information processing circuit 200, and after outputting the operation stop instruction 140, the fault diagnosis circuit 300 reads out the information-processing substitution circuit information 420 in the circuit-information storage memory 400 as circuit information 150. The fault diagnosis circuit 300 then operates as the information-processing substitution circuit 500 that substitutes for the function of the information processing circuit 200, based on the information-processing substitution circuit information 420.

Figure 2:
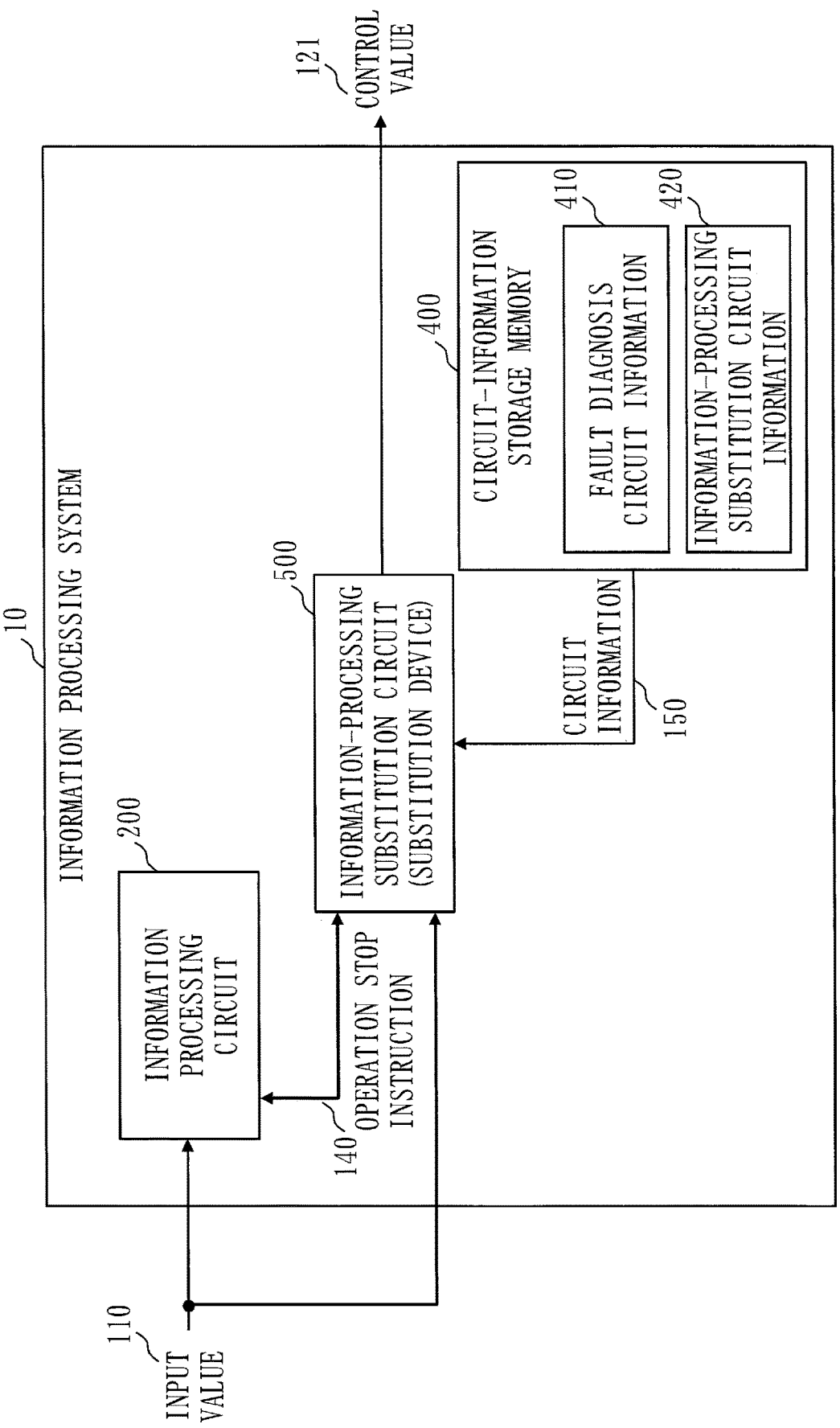
FIG. 2 is a diagram illustrating a configuration example of the information processing system including an information-processing substitution circuit according to the first embodiment.

FIG. 2 illustrates a configuration example of the information processing system 10 when the information-processing substitution circuit 500 operates.

At the stage of FIG. 2, since a fault has occurred in the information processing circuit 200, the operation thereof has been stopped by the operation stop instruction 140 from the fault diagnosis circuit 300.

The information-processing substitution circuit 500 performs a similar arithmetic operation to that of the information processing circuit 200 based on the input value 110 to generate a control value 121, and outputs the generated control value 121 to the control target device.

Figure 3:
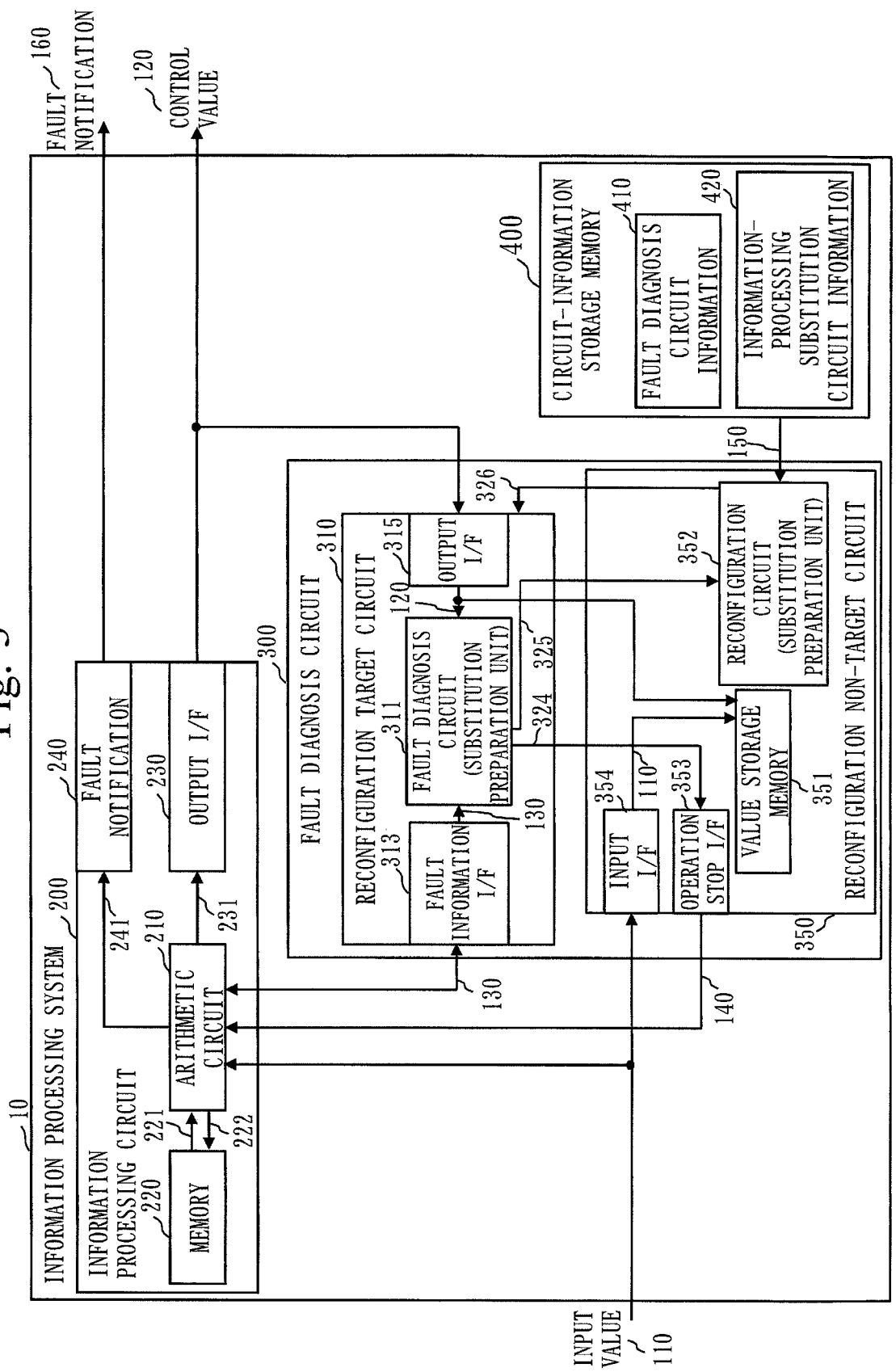
FIG. 3 is a flowchart illustrating details of a configuration example of the information processing system including the fault diagnosis circuit according to the first embodiment.

FIG. 3 illustrates details of the configuration of the information processing system 10 when the fault diagnosis circuit 300 operates.

The information processing circuit 200 is configured by an arithmetic circuit 210, a memory 220, an output interface 230, and a fault notification interface 240. The output interface 230 is also described as output I/F 230. The fault notification interface 240 is also described as fault notification I/F 240.

The arithmetic circuit 210 performs an arithmetic operation based on the input value 110 according to an arithmetic program 221 stored in the memory 220. The output interface 230 outputs an arithmetic operation result 231 to a control target device outside of the information processing system 10 as the control value 120.

The memory 220 stores therein intermediate data 222 in the middle of the arithmetic operation.

The arithmetic circuit 210 diagnoses the state of the fault diagnosis circuit 300 to detect a fault in the fault diagnosis circuit 300. The arithmetic circuit 210 determines that a fault has occurred in the fault diagnosis circuit 300, when the fault diagnosis circuit 300 does not perform a specified operation, for example, there is no access for acquiring the fault diagnosis information 130 from the fault diagnosis circuit 300 for a certain period of time.

Even if the fault diagnosis circuit 300 is in a faulty state, the operation of the information processing system 10 does not become abnormal. Therefore, when the fault diagnosis circuit 300 has a fault, the arithmetic circuit 210 does not bring the information processing system 10 to emergency stop. Specifically, the arithmetic circuit 210 outputs fault information 241 to the fault notification interface 240, and the fault notification interface 240 outputs a fault notification 160 to the outside of the information processing system 10. By the output of the fault notification 160, it can be notified to a user of the information processing system 10 that a fault has occurred in the fault diagnosis circuit 300. When stopping of the information processing system 10 is required, the user stops the information processing system 10 after ensuring the safety.

The fault diagnosis circuit 300 is configured by a reconfiguration target circuit 310 and a reconfiguration non-target circuit 350.

The reconfiguration target circuit 310 changes the circuit configuration between a case where the fault diagnosis circuit 300 operates and a case where the information-processing substitution circuit 500 operates.

The reconfiguration non-target circuit 350 does not change the circuit configuration between the case where the fault diagnosis circuit 300 operates and the case where the information-processing substitution circuit 500 operates.

When the fault diagnosis circuit 300 operates, as illustrated in FIG. 3, the reconfiguration target circuit 310 is configured by a fault information interface 313, a fault diagnosis circuit 311, and an output interface 315. The fault information interface 313 is also described as fault information I/F 313. The output interface 315 is also described as output I/F 315.

The fault information interface 313 acquires the fault diagnosis information 130 from the information processing circuit 200. The fault information interface 313 accesses the arithmetic circuit 210, for example, regularly to acquire the fault diagnosis information 130 from the arithmetic circuit 210. The fault information interface 313 outputs the fault diagnosis information 130 to the fault diagnosis circuit 311.

The output interface 315 receives the control value 120 from the information processing circuit 200. The output interface 315 outputs the control value 120 to the fault diagnosis circuit 311. The output interface 315 also outputs the control value 120 to a value storage memory 351 described later.

The fault diagnosis circuit 311 diagnoses the state of the information processing circuit 200 by using the fault diagnosis information 130 and the control value 120, to detect a fault in the information processing circuit 200.

Further, upon detection of a fault in the information processing circuit 200, the fault diagnosis circuit 311 outputs a fault detection notification 325 to a reconfiguration circuit 352 described later. The fault diagnosis circuit 311 also outputs an operation stop instruction 324 to an operation stop interface 353 described later. The fault detection notification 325 is a signal notifying detection of a fault in the information processing circuit 200. The operation stop instruction 324 is a signal instructing operation stop of the information processing circuit 200.

For example, when the control value 120 is an abnormal value exceeding a predetermined upper limit or lower limit, the fault diagnosis circuit 311 determines that a fault has occurred in the information processing circuit 200. Further, when an abnormality has occurred, such as an ECC (Error Correction Code) error generated in the arithmetic circuit 210 or the memory 220 of the information processing circuit 200 or a CRC (Cyclic Redundancy Check) error of the input value 110, the fault diagnosis circuit 311 determines that a fault has occurred in the information processing circuit 200.

The reconfiguration non-target circuit 350 is configured by the value storage memory 351, the reconfiguration circuit 352, the operation stop interface 353, and an input interface 354. The operation stop interface 353 is also described as operation stop I/F 353. The input interface 354 is also described as input I/F 354.

The value storage memory 351 memorizes therein the input value 110 and the control value 120.

The input interface 354 acquires the input value 110 and writes the acquired input value 110 in the value storage memory 351. The control value 120 is written in the value storage memory 351 by the output interface 315.

The reconfiguration circuit 352 acquires the fault detection notification 325 from the fault diagnosis circuit 311. The fault detection notification 325 is, as described above, a signal notifying detection of a fault in the information processing circuit 200. Upon acquisition of the fault detection notification 325, the reconfiguration circuit 352 reads out the information-processing substitution circuit information 420 as the circuit information 150 from the circuit-information storage memory 400. The reconfiguration circuit 352 transmits reconfiguration information 326 based on the information-processing substitution circuit information 420 to the reconfiguration target circuit 310. The fault diagnosis circuit 311 reconfigures the reconfiguration target circuit 310 as a reconfiguration target circuit 510 described later based on the reconfiguration information 326. That is, the fault diagnosis circuit 311 and the reconfiguration circuit 352 perform preparation for the information-processing substitution circuit 500 to substitute for the information processing circuit 200. The fault diagnosis circuit 311 and the reconfiguration circuit 352 correspond to a substitution preparation unit.

The operation stop interface 353 acquires the operation stop instruction 324 from the fault diagnosis circuit 311. As described above, the operation stop instruction 324 is a signal instructing operation stop of the information processing circuit 200. When the operation stop interface 353 acquires the operation stop instruction 324, since the information processing circuit 200 is likely to performs an erroneous operation due to a fault, the operation stop interface 353 outputs the operation stop instruction 140 to the information processing circuit 200 to cause the information processing circuit 200 to stop its operation.

The information processing circuit 200 continuously stops its operation even after the fault diagnosis circuit 300 is reconfigured as the information-processing substitution circuit 500.

Figure 4:
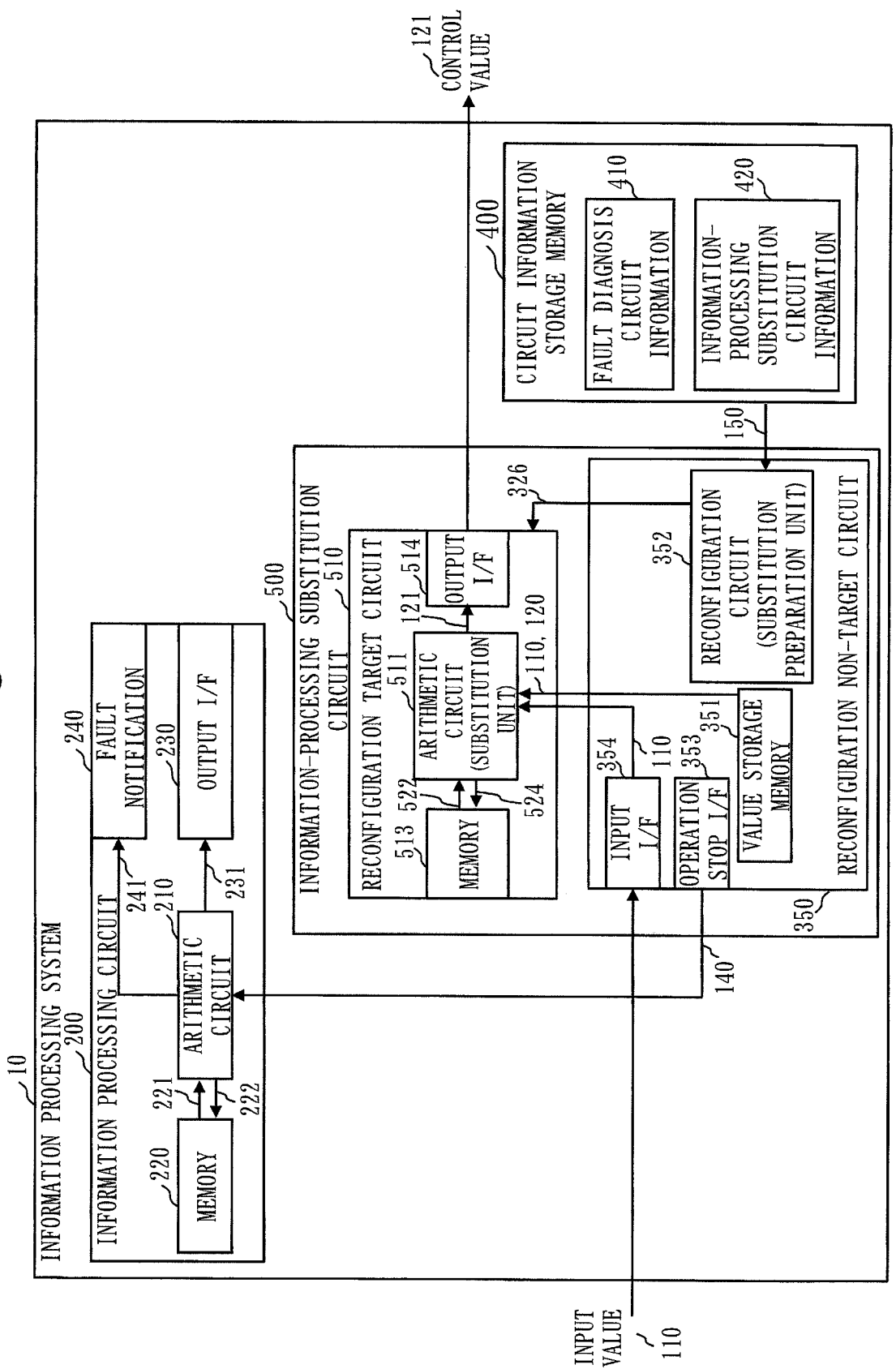
FIG. 4 is a diagram illustrating details of a configuration example of the information processing system including the information-processing substitution circuit according to the first embodiment.

FIG. 4 illustrates details of the configuration of the information processing system 10 when the information-processing substitution circuit 500 operates.

Since the information processing circuit 200 and the circuit-information storage memory 400 are the same as those illustrated in FIG. 3, explanations of the information processing circuit 200 and the circuit-information storage memory 400 are omitted.

The information-processing substitution circuit 500 is configured by the reconfiguration target circuit 510 and the reconfiguration non-target circuit 350. Since the reconfiguration non-target circuit 350 is the same as that illustrated in FIG. 3, explanations of the reconfiguration non-target circuit 350 are omitted.

The reconfiguration target circuit 510 is configures by an arithmetic circuit 511, a memory 513, and an output interface 514. The output interface 514 is also described as output I/F 514.

The arithmetic circuit 511 acquires the input value 110 from the input interface 354. The arithmetic circuit 511 performs an arithmetic operation based on the input value 110 according to an arithmetic program 522 stored in the memory 513 to generate the control value 121. The control value 121 is output to the control target device from the output interface 514.

Intermediate data 524 in the middle of the arithmetic operation is also stored in the memory 513.

It is also possible that the arithmetic circuit 511 is not the same as the arithmetic circuit 210 of the information processing circuit 200. Further, it is also possible that the arithmetic program 522 in the memory 513 is not the same as the arithmetic program 221 in the memory 220 of the information processing circuit 200. That is, the arithmetic circuit 511 and the arithmetic program 522 only need to be able to realize the function simulating the operation of the information processing circuit 200.

The arithmetic circuit 511 generates an output plan of the control value 121 at the time of completion of preparation for substituting for the information processing circuit 200. The arithmetic circuit 511 generates the control value 121 according to the generated output plan, and outputs via the output interface 514 the control value 121 to the control target device instead of the information processing circuit 200.

More specifically, the arithmetic circuit 511 generates an output plan of the control value such that a difference between an actual output value of the control target device and an output value in a scheduled temporal transition gradually decreases, based on the scheduled temporal transition being a temporal transition of the output value of the control target device, which is scheduled before the occurrence of a fault in the information processing circuit 200, a difference between the actual output value of the control target device at a point of time when preparation is complete and the output value in the scheduled temporal transition, and the input value 110 and the control value 120 before the occurrence of the fault in the information processing circuit (for example, the input value 110 and the control value 120 immediately before the occurrence of the fault). The arithmetic circuit 511 outputs the control value 121 to the control target device instead of the information processing circuit 200 according to the generated output plan.

In this manner, the arithmetic circuit 511 avoids a sudden change of the operation of the control target device.

The arithmetic circuit 511 corresponds to a substitution unit.

Figure 5:
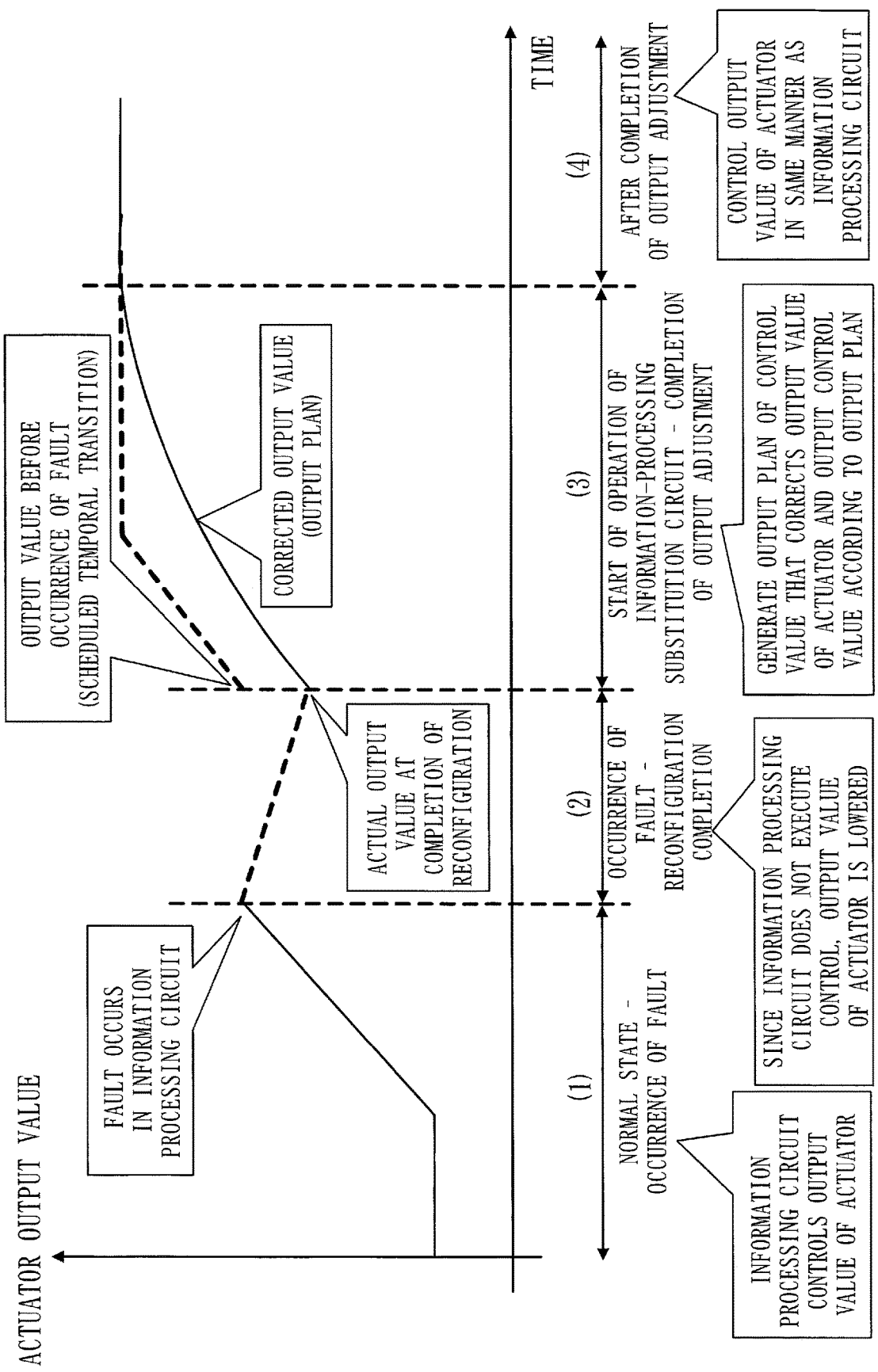
FIG. 5 is a diagram illustrating a relation between a state of the information processing system and an output of an actuator according to the first embodiment.

FIG. 5 illustrates a relation between the state of the information processing system 10 and an output of an actuator.

In FIG. 5, an actuator is used as an example of the control target device.

In FIG. 5, in a state (1), since the information processing circuit 200 operates normally, an output value of the actuator is controlled by the information processing circuit 200. That is, in the state (1), the information processing circuit 200 generates the control value 120 based on the input value 110 and outputs the control value 120. The output value of the actuator is controlled based on the control value 120. In the state (1), every time the input value 110 and the control value 120 are updated, the updated input value 110 and control value 120 are memorized in the value storage memory 351.

In a state (2), a fault occurs in the information processing circuit 200, and the reconfiguration circuit 352 reconfigures the fault diagnosis circuit 300 as the information-processing substitution circuit 500. In the state (2), since the information processing circuit 200 has stopped its operation, the information processing circuit 200 cannot control the actuator. Since reconfiguration of the information-processing substitution circuit 500 is not complete, the information-processing substitution circuit 500 cannot control the actuator. Therefore, in the state (2), the output value of the actuator is lowered.

In a state (3), reconfiguration of the information-processing substitution circuit 500 is complete. That is, preparation for the information-processing substitution circuit 500 to substitute for the information processing circuit 200 is complete. Therefore, the information-processing substitution circuit 500 starts to control the actuator. However, the output of the actuator has been lowered during the state (2). Therefore, if the information-processing substitution circuit 500 performs the arithmetic operation that has been performed by the information processing circuit 200 as it is, without taking into consideration the actual output value of the actuator that has been lowered during the state (2), the operation of the actuator changes suddenly.

That is, if the arithmetic circuit 511 performs the same operation as that of the arithmetic circuit 210 to generate the control value 121 and outputs the control value 121 to the actuator, an output value of the actuator becomes an output value before the occurrence of the fault indicated by a broken line. The temporal transition of the output value before the occurrence of the fault indicated by the broken line, corresponds to the scheduled temporal transition. Since the output value before the occurrence of the fault is largely different from an actual output value of the actuator at the time of completion of reconfiguration, the operation of the actuator changes suddenly.

In order to avoid a sudden change of the operation of the actuator, the arithmetic circuit 511 generates an output plan of the control value for correcting the output value, and outputs the control value to the actuator according to the output plan.

More specifically, the arithmetic circuit 511 acquires the actual output value of the actuator at the time of completion of reconfiguration, and acquires the scheduled temporal transition of the output value before the occurrence of the fault. Further, the arithmetic circuit 511 acquires the input value 110 before the occurrence of the fault and the control value 120 before the occurrence of the fault that is memorized in the value storage memory 351.

Next, the arithmetic circuit 511 generates an output plan as illustrated in FIG. 5, based on the scheduled temporal transition, a difference between the actual output value of the actuator at the time of completion of reconfiguration and an output value in the scheduled temporal transition, and the input value 110 and the control value 120 before the occurrence of the fault. The output plan is a plan such that the difference between an actual output value of a control target device and an output value in a scheduled temporal transition gradually decreases. That is, the output plan is a plan such that the output value of the actuator gradually approaches the output value of the actuator before the occurrence of a fault. The arithmetic circuit 511 generates the control value 121 according to the output plan and the output interface 514 outputs the control value 121 to the actuator.

The arithmetic circuit 511 generates an output plan such that an output value of the actuator approaches an output value in the scheduled temporal transition gradually by 10 percent, every time the control value 121 is output. With such an output plan, the actual output value of the actuator becomes the same as the output value in the scheduled temporal transition at a stage in which the control value 121 has been output about 10 times. On the other hand, according to such an output plan, sudden control of the actuator can be avoided.

In a state (4), since the output value of the actuator becomes the same as the output value in the scheduled temporal transition, the arithmetic circuit 511 performs the same arithmetic operation as that of the arithmetic circuit 210 to generate the control value 121. That is, the arithmetic circuit 511 performs a normal operation based on the input value 110.

Descriptions of Operations

Figure 6:
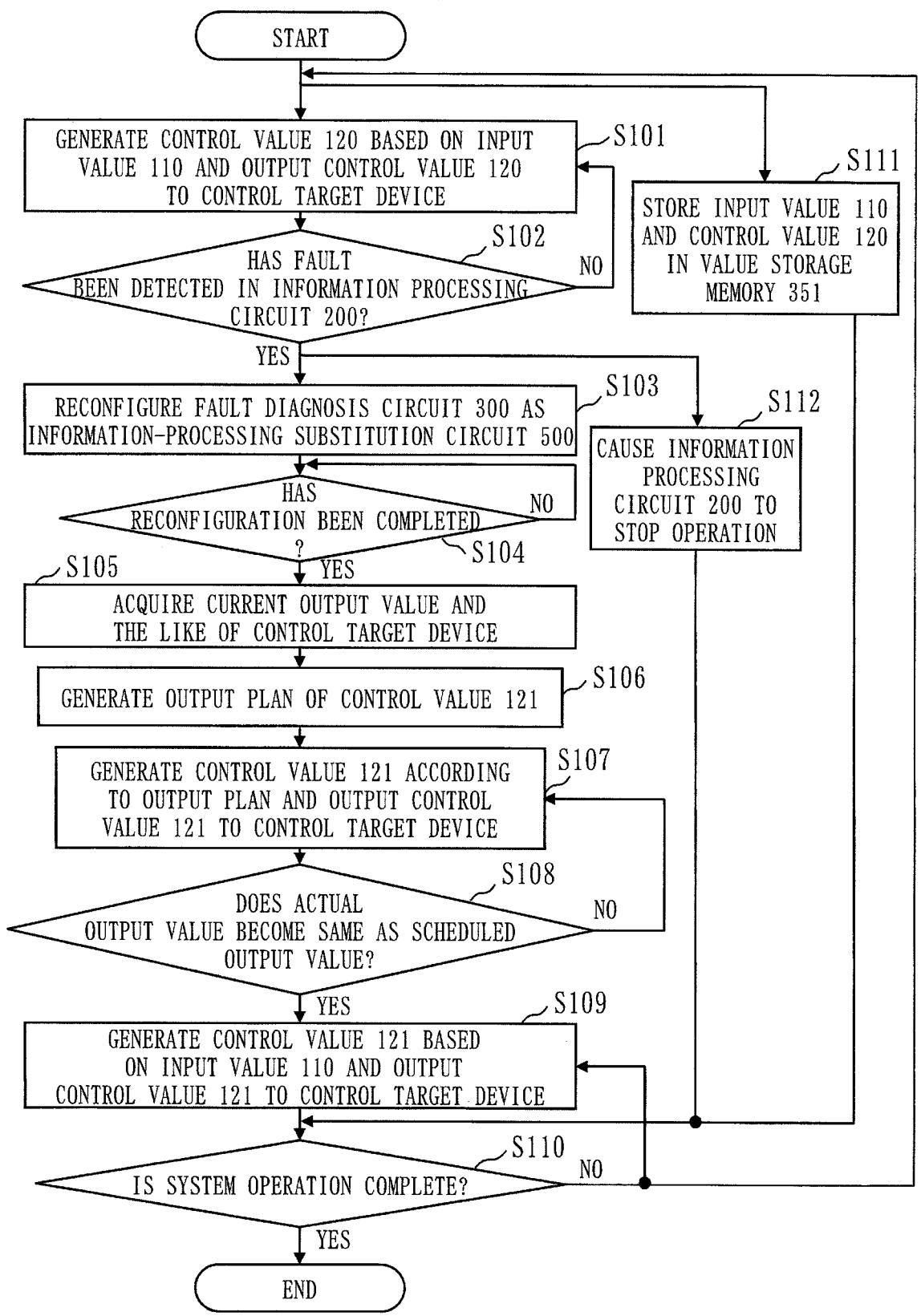
FIG. 6 is a flowchart illustrating an operation example of the information processing system according to the first embodiment.

FIG. 6 illustrates an operation example of the information processing system 10 according to the present embodiment.

The operation of the information processing system 10 is described below with reference to FIG. 6.

First, the information processing circuit 200 generates the control value 120 based on the input value 110 and outputs the control value 120 to the control target device (Step S101).

Further, every time the input value 110 and the control value 120 are generated, the value storage memory 351 memorizes therein the input value 110 and the control value 120 (Step S111).

When the fault diagnosis circuit 311 has detected a fault in the information processing circuit 200 (YES in Step S102), the reconfiguration circuit 352 uses the information-processing substitution circuit information 420 to reconfigure the fault diagnosis circuit 300 as the information-processing substitution circuit 500 (Step S103).

In parallel, the operation stop interface 353 outputs the operation stop instruction 140 to the information processing circuit 200, to cause the information processing circuit 200 to stop its operation (Step S112).

When reconfiguration of the fault diagnosis circuit 300 as the information-processing substitution circuit 500 is complete (YES in Step S104), the arithmetic circuit 511 acquires the current output value of the control target device, the scheduled temporal transition of the output value, and the input value 110 and the control value 120 before the occurrence of the fault (Step S105).

Next, the arithmetic circuit 511 generates an output plan of the control value 121 based on the current output value of the control target device, the scheduled temporal transition of the output value, and the input value 110 and the control value 120 before the occurrence of the fault (Step S106).

The arithmetic circuit 511 then generates the control value 121 according to the output plan generated in Step S106 and the output interface 514 outputs the control value 121 to the control target device (Step S107).

When the actual output value of the control target device becomes the same as an output value scheduled before the occurrence of the fault in the information processing circuit 200 (YES in Step S108), the arithmetic circuit 511 generates the control value 121 based on the input value 110 and the output interface 514 outputs the control value 121 to the control target device (Step S109). That is, the arithmetic circuit 511 generates the control value 121 by performing the same arithmetic operation as that of the arithmetic circuit 210 in the information processing circuit 200.

If a user of the information processing system 10 instructs operation completion of the information processing system 10 (YES in S110), the information processing system 10 completes the operation.

If the user does not instruct operation completion of the information processing system 10 (NO in S110), and if the information processing system 10 operates normally, the operations after Step S101 are repeated. On the other hand, if the information-processing substitution circuit 500 operates, the operation in Step S109 is repeated.

Descriptions of Effects of Embodiment

As described above, according to the present embodiment, the information-processing substitution circuit 500 generates an output plan of a control value such that a difference between an actual output value of a control target device and an output value in a scheduled temporal transition gradually decreases, and outputs the control value to the control target device according to the generated output plan. Therefore, according to the present embodiment, the information-processing substitution circuit 500 can control the control target device appropriately, even if the output state of the control target device has changed.

Further, according to the present embodiment, the information processing circuit 200 can detect a fault in the fault diagnosis circuit 300.

If a fault has occurred in the fault diagnosis circuit 300, detection of a fault in the information processing circuit 200 and the operation of substituting for the information processing circuit 200 cannot be performed. In order to improve the reliability of the information processing system 10, detection of a fault in the fault diagnosis circuit 300 is also required. According to the present embodiment, by monitoring the fault diagnosis circuit 300 by the information processing circuit 200, the reliability of the information processing system 10 can be improved.

In the above, the reconfiguration non-target circuit 350 is present in the fault diagnosis circuit 300 and the information-processing substitution circuit 500. However, the reconfiguration non-target circuit 350 can be present outside of the fault diagnosis circuit 300 and the information-processing substitution circuit 500.

REFERENCE SIGNS LIST

10: information processing system; 110: input value; 120: control value; 121: control value; 130: fault diagnosis information; 140: operation stop instruction; 150: circuit information; 160: fault notification; 200: information processing circuit; 210: arithmetic circuit; 220: memory; 221: arithmetic program; 222: intermediate data; 230: output interface; 231: arithmetic operation result; 240: fault notification interface; 241: fault information; 300: fault diagnosis circuit; 310: reconfiguration target circuit; 311: fault diagnosis circuit; 313: fault information interface; 315: output interface; 324: operation stop instruction; 325: fault detection notification; 326: reconfiguration information; 350: reconfiguration non-target circuit; 351: value storage memory; 352: reconfiguration circuit; 353: operation stop interface; 354: input interface; 400: circuit-information storage memory; 410: fault diagnosis circuit information; 420: information-processing substitution circuit information; 500: information-processing substitution circuit; 510: reconfiguration target circuit; 511: arithmetic circuit; 513: memory; 514: output interface; 522: arithmetic program; 524: intermediate data

The invention claimed is:

1. A substitution device comprising:
processing circuitry to:
perform preparation for substituting for an information processing circuit that generates a control value for controlling an output value of a control target device based on an input value, and that outputs the control value generated to the control target device, when a fault occurs in the information processing circuit;
generate, upon completion of the preparation, an output plan of a control value such that a difference between an actual output value of the control target device and an output value in a scheduled temporal transition gradually decreases, based on the scheduled temporal transition corresponding to an output value of the control target device, which is scheduled before occurrence of the fault in the information processing circuit, a difference between an actual output value of the control target device upon completion of the preparation and the output value in the scheduled temporal transition, and an input value and a control value before occurrence of the fault in the information processing circuit; and
output a control value to the control target device instead of the information processing circuit according to the output plan generated, wherein
the output plan is generated in response to a decrease in the output value of the control target device in a period where each of the information processing circuit and the substitution device is not able to generate and output a control value to the control target device to control the control target device.

2. The substitution device according to claim 1, wherein the processing circuitry generates the output plan based on a difference between an actual output value of the control target device at a time when the preparation is completed and an output value in the scheduled temporal transition, which is generated as a result of absence of output of a control value during a period after occurrence of the fault in the information processing circuit until completion of the preparation.

3. The substitution device according to claim 1, wherein the processing circuitry generates the output plan based on an input value and a control value immediately before occurrence of the fault in the information processing circuit.

4. An information processing system comprising:
an information processing circuit to generate a control value for controlling an output value of a control target device based on an input value, and outputs the control value generated to the control target device;

a substitution device to perform preparation for substituting for the information processing circuit when a fault occurs in the information processing circuit, and upon completion of the preparation, generate an output plan of a control value such that a difference between an actual output value of the control target device and an output value in a scheduled temporal transition gradually decreases, based on the scheduled temporal transition corresponding to an output value of the control target device, which is scheduled before occurrence of the fault in the information processing circuit, a difference between an actual output value of the control target device upon completion of the preparation and the output value in the scheduled temporal transition, and an input value and a control value before occurrence of the fault in the information processing circuit, wherein the substitution device outputs a control value to the control target device instead of the information processing circuit according to the output plan generated, and the output plan is generated in response to a decrease in the output value of the control target device in a period where each of the information processing circuit and the substitution device is not able to generate and output a control value to the control target device to control the control target device.

5. The information processing system according to claim 4, wherein the information processing circuit monitors the substitution device for detecting a fault in the substitution device.

6. A substitution method comprising:

performing preparation for substituting for an information processing circuit that generates a control value for controlling an output value of a control target device based on an input value, and that outputs the control value generated to the control target device, when a fault occurs in the information processing circuit, by a substitution device that substitutes for the information processing circuit;

upon completion of the preparation, by the substitution device, generating an output plan of a control value such that a difference between an actual output value of the control target device and an output value in a scheduled temporal transition gradually decreases, based on the scheduled temporal transition corresponding to an output value of the control target device, which is scheduled before occurrence of the fault in the information processing circuit, a difference between an actual output value of the control target device upon completion of the preparation and the output value in the scheduled temporal transition, and an input value and a control value before occurrence of the fault in the information processing circuit; and outputting a control value to the control target device instead of the information processing circuit according to the output plan generated, wherein generating the output plan is performed in response to a decrease in the output value of the control target device in a period where each of the information processing circuit and the substitution device is not able to generate and output a control value to the control target device to control the control target device.

* * * * *